W. C. YORAN.
MEASURING INSTRUMENT.
APPLICATION FILED APR. 8, 1915.
1,162,276.
Patented Nov. 30, 1915.
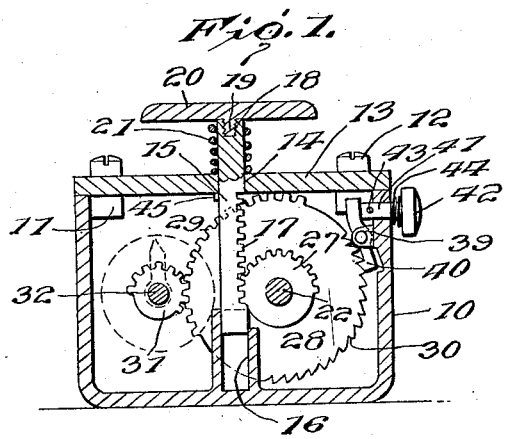
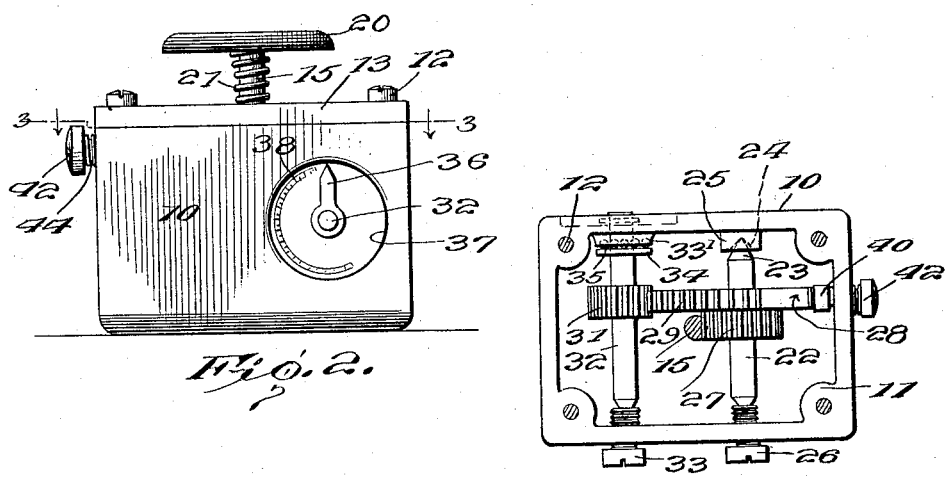
Inventor
W. C. Yoran
By
Attorneys

UNITED STATES PATENT OFFICE.

WILLIAM C. YORAN, OF EUGENE, OREGON.

MEASURING INSTRUMENT.

1,162,276. Specification of Letters Patent. Patented Nov. 30, 1915.

Application filed April 8, 1915. Serial No. 20,035.

*To all whom it may concern:*

Be it known that I, WILLIAM C. YORAN, a citizen of the United States, residing at Eugene, in the county of Lane and State of Oregon, have invented certain new and useful Improvements in Measuring Instruments, of which the following is a specification.

My present invention relates to new and useful improvements in measuring instruments and more particularly to measuring instruments for use in connection with printing presses, the primary object of my invention being the provision of a device by means of which the height of the rollers or cylinders of a cylinder press may be determined.

A still further object of my invention is to construct a device by means of which the pressure at the corners of platen presses may be determined in order to permit truing of the presses. In this connection, I provide a device having an indicating needle which moves in proportion to the pressure exerted against a plunger in order that the needle may properly indicate the force exerted against the plunger.

A still further object of my invention consists in the provision of means for automatically locking the indicator needle in any position into which it may have been moved in order that its position may be easily read, this locking means being manually releasable to cause return of the needle to normal position.

With these and other objects in view, my invention will be more fully described, illustrated in the accompanying drawings, and then specifically pointed out in the claims which are attached to and form a part of this application.

In the drawings: Figure 1 is a central, vertical, longitudinal sectional view of my improved measuring instrument; Fig. 2 is a front elevation of the instrument; Fig. 3 is a transverse sectional view taken on the line 3—3 of Fig. 2.

Corresponding and like parts are referred to in the following description and indicated in all the views of the drawings by the same reference characters.

My improved measuring instrument includes a substantially parallel-piped shaped casing or housing 10, preferably formed of metal with an integrally formed bottom and open at its top. This casing is provided interiorly adjacent its top edge with ears 11 having tapped bores to receive machine screws 12 by means of which a cover plate 13 may be secured in place to close the casing. This cover plate centrally is provided with an opening 14 to snugly receive a plunger 15 which is free for reciprocation through the opening 14 and in a tubular bearing 16 formed upon the bottom wall of the casing. The lower portion of this plunger is preferably square or rectangular in cross section to fit in the bearing 16 which is correspondingly shaped in order that it may not turn and is provided in one face with a series of rack teeth 17. The outer end of the plunger is provided with an internally threaded socket 18 to receive the threaded stud 19 of a plunger head 20, preferably circular in shape. A helical spring 21 surrounds the outer portion of the plunger 15 bearing at one end against the plunger head 20 and at its other end against the cap plate 13 to normally hold the plunger in elevated position.

A shaft 22, preferably formed with conical terminals 23, has one of these terminals journaled in a conical socket 24 formed in a boss 25 projecting from the front wall of the casing and its opposite terminal journaled in a correspondingly formed socket in the inner end of an adjusting screw 26 which is threaded through the front wall of the casing in alinement with the boss 25. By this means, the shaft is journaled for rotation and by proper setting of the screw 26 may be held against any lateral or longitudinal movement, while at the same time minimum frictional resistance to its turning movement will be offered. A pinion 27, keyed or otherwise secured upon the shaft 22, meshes with the rack teeth 17, while a combined gear and ratchet wheel, indicated as a whole by the numeral 28, is also keyed or otherwise secured upon the shaft 22. This combined gear and ratchet wheel 28 is provided about a portion of its circumference with gear teeth 29 and about the opposite portion of its circumference with ratchet teeth 30.

The gear teeth 29 mesh with the teeth of a pinion 31 carried by a second shaft 32 which extends parallel to the shaft 22, having one conical end journaled in a socket in an adjusting screw 33 corresponding to the adjusting screw 26 and having its opposite end extended through an opening formed in the wall of the casing 10. In order to reduce the friction as much as possible, such wall of the casing is provided interiorly with a ball race 33′ carrying ball bearings 34 which engage against a collar 35 carried by the shaft 32. The outer end of the shaft 32 carries an indicating needle 36 which, upon turning of the shaft, moves in a circular recess 37 formed in the outer face of the front wall of the casing and over scale divisions 38 engraved or otherwise suitably inscribed upon such wall. It will of course be clear that downward pressure against the plunger 20 will act through the plunger 15, pinion 27, shaft 22, wheel 28, pinion 31 and shaft 32 to turn the indicating needle 36 a distance proportionate to the amount of downward movement of the plunger head. It will also be clear that because of the spring 21, the amount of movement of the plunger head will also be proportional to the pressure exerted against it, for which reason, the needle will indicate both the pressure exerted against the plunger and the height between the bottom of the casing and the upper face of the plunger head.

One end wall of the casing is provided with inwardly directed spaced ears 39 and a pawl 40 is pivotally mounted between these ears in position to engage the ratchet teeth 30 of the combined gear and ratchet wheel 28. This pawl is of the gravity operated type and automatically engages the ratchet teeth to hold the gear and ratchet wheel against reverse movement, due to the action of the spring 21, and, consequently, to hold the indicating needle in any position into which it may have been moved by pressure against the plunger. As shown, this pawl is pivoted intermediate its length and a releasing plunger 41, reciprocally mounted in the end wall of the casing, engages at its inner end against the free end of the pawl in such a manner that inward pressure against the plunger 41 will release the pawl. This plunger 41, at its outer end, is provided with a button 42 to facilitate application of pressure thereagainst, and a pin 43 is passed through the plunger adjacent its inner end to limit outward movement of the plunger and prevent its disengagement from the wall of the casing. A relatively light helical spring 44 surrounds the plunger 41 between the button 42 and casing wall to normally hold the plunger in such a position as to permit the pawl to engage the ratchet teeth 30.

In operation, the device may be placed under either end of the cylinder or roller, the pressure of which is to be measured, and this positioning of the device will cause downward movement of the plunger and consequent movement of the indicating needle, of course, being held in position by the cylinder or roller upon the device, the needle, of course, being held in position by the pawl 40 until the latter is released. The device may also be used in the same manner for determining the pressure upon the corners of platen presses for the purpose of truing the presses.

The whole device, which is shown upon an enlarged scale in the drawings, is, in practice, but one inch high or a little more than type high. The plunger 15 may be provided with a lug or pin 45 to limit its upward movement.

It will of course be understood that I do not wish to be limited to the specific details of construction illustrated and described as various minor changes, within the scope of the appended claims, may be made at any time, without in the slightest degree departing from the spirit of my invention.

Having thus described the invention, what is claimed as new is:

1. A measuring instrument including a casing, a plunger reciprocally mounted in the casing and provided exteriorly with a head, a spring bearing between the casing and head to normally hold the plunger extended, the plunger being formed with rack teeth, spaced shafts journaled in the casing, a pinion carried by one shaft meshing with the rack teeth, a wheel also carried by the same shaft and provided throughout a portion of its circumference with gear teeth and through an opposite portion of its circumference with ratchet teeth, a pinion mounted on the second shaft and meshing with the gear teeth of such wheel, one end of the second shaft being extended beyond the casing, an indicating needle carried upon the extended end of the second shaft, and means engageable with the ratchet teeth for locking the wheel against counter-movement, due to the spring.

2. A measuring instrument including a casing, a plunger reciprocally mounted in the casing and provided exteriorly with a head, a spring bearing between the casing and head to normally hold the plunger extended, the plunger being formed with rack teeth, spaced shafts journaled in the casing, a pinion carried by one shaft meshing with the rack teeth, the wheel also carried by the same shaft and provided throughout a portion of its circumference with gear teeth and through an opposite portion of its circumference with ratchet teeth, a pinion mounted on the second shaft and meshing with the gear teeth of such wheel, one end of the second shaft being extended beyond the casing, an indicating needle carried upon the extended end of the second shaft, and means engageable with the ratchet teeth for locking the wheel against counter-movement, due to the spring, said means including a pawl mounted in the casing and movable into engagement with the ratchet teeth by gravity, and a second plunger movable manually to swing the pawl out of engagement with the ratchet teeth.

In testimony whereof I affix my signature in presence of two witnesses.

WILLIAM C. YORAN. [L. S.]

Witnesses:
 DARWIN BRISTOW,
 ARCHIE W. LIVERMORE.

Copies of this patent may be obtained for five cents each, by addressing the "Commissioner of Patents, Washington, D. C."